July 30, 1963 B. K. KENNEDY 3,099,376

TAPE FEEDING DEVICE

Filed June 8, 1961

*INVENTOR.*
BUFORD K. KENNEDY
*BY* Arthur H. Swanson
ATTORNEY.

United States Patent Office
3,099,376
Patented July 30, 1963

3,099,376

TAPE FEEDING DEVICE

Buford K. Kennedy, Greenbelt, Md., assignor to Minneapolis-Honeywell Regulator Company, Minneapolis, Minn., a corporation of Delaware Filed June 8, 1961, Ser. No. 115,641
3 Claims. (Cl. 226—108)

This invention relates to tape transports. More specifically, the present invention relates to capstan means for driving a tape.

An object of the present invention is to provide an improved capstan means for uniformly driving a tape passing thereacross.

Another object of the present invention is to provide an improved capstan means for simultaneously uniformly feeding and withdrawing a moving tape with respect to a loop path of the tape.

A further object of the present invention is to provide an improved capstan means for uniformly driving a moving tape in a loop while maintaining a state of tension in the loop portion of the tape.

A still further object of the present invention is to provide an improved capstan means, as set forth herein, which is characterized by simplicity of operation and construction.

In accomplishing these and other objects, there has been provided, in accordance with the present invention, a capstan having a tape-supporting cylindrical surface concentric with and supported by a driven hub. This surface is divided into three adjacent cylindrical segments having similar diameters. The center segment of the three segments is rotatably mounted on the hub independently of the other two segments, which two segments are joined to the driven hub. A first pinch roller is rotatably supported adjacent to a first peripheral portion of the cylindrical surface and is adapted to press a moving tape against the first peripheral portion of the two segments joined to the driven hub. A second pinch roller is also rotatably mounted adjacent to a second peripheral portion of the cylindrical surface substantially diametrically opposite to that portion adjacent to the first pinch roller. The second pinch roller is arranged to be driven by the driven hub at a lower peripheral speed than the cylindrical surface and is adapted to press the moving tape against the second portion of the rotatably mounted center cylindrical segment.

A better understanding of the present invention may be had from the following detailed description when read in connection with the accompanying drawing, in which.

Figures 1, 2, 3:
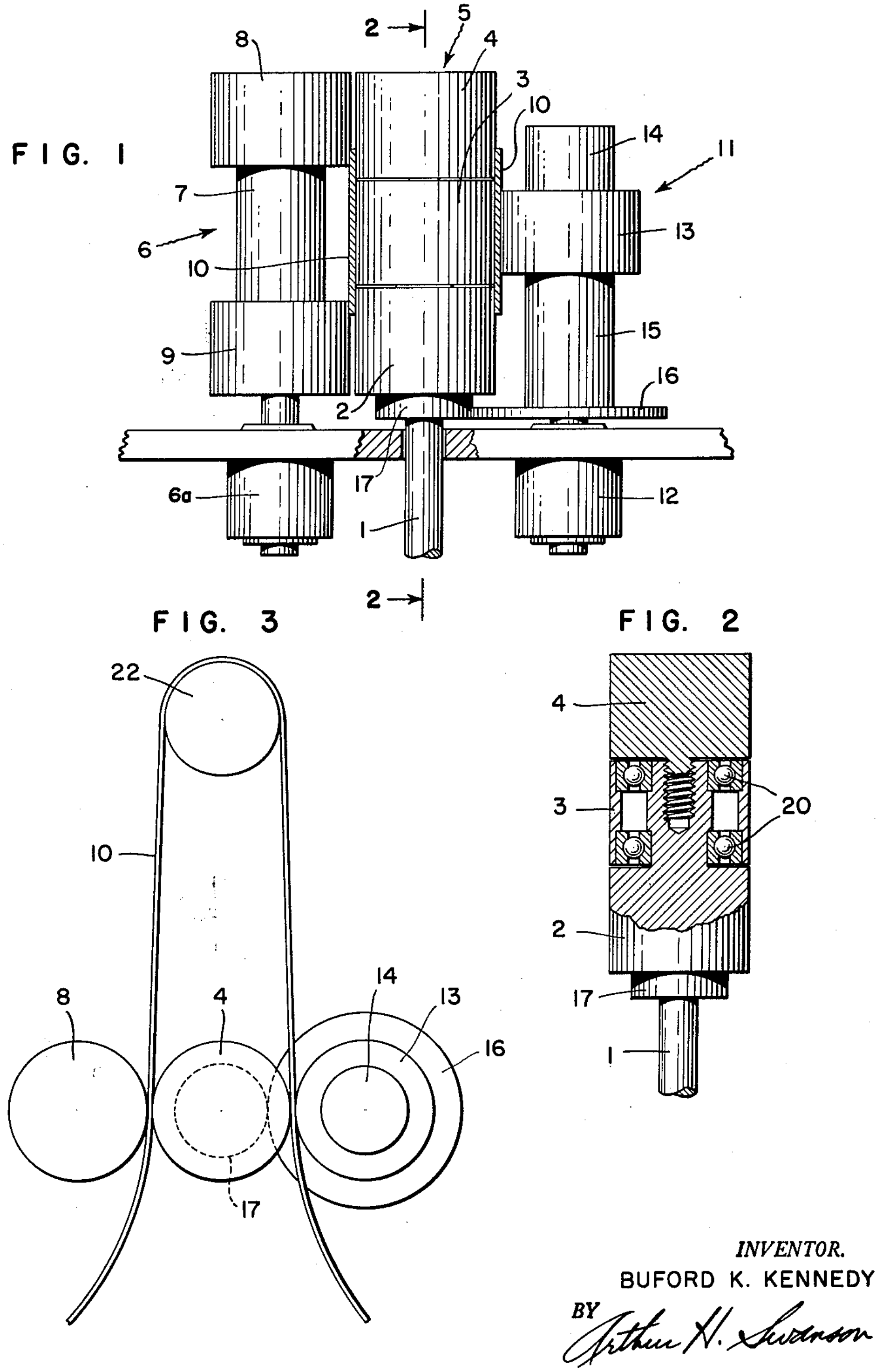
FIG. 1 is a pictorial representation of the capstan means of the present invention.
FIG. 2 is a cross-section of the capstan means shown in FIG. 1 taken along line 2—2.
FIG. 3 is a simplified pictorial representation of the loop path of a tape driven by the capstan means shown in FIG. 1.

Referring to FIG. 1 in more detail, there is shown a capstan means comprising a driven hub 1 having mounted thereon three adjacent cylindrical segments 2, 3 and 4 to form a capstan 5. The three segments 2, 3 and 4 have similar diameters and are each arranged coaxially with the driven hub 1 and adjacent to each other to form a tape-supporting cylindrical surface. The two outer segments 2 and 4 are joined to the hub 1 to be driven thereby.

A first pinch roller 6 is rotatably supported by a support means *6a* adjacent to the segments 2, 3 and 4. The roller 6 is arranged to have a center section 7 having a smaller diameter than a pair of end sections 8 and 9. The support means *6a* is also arranged to resiliently press the pinch roller 6 against a peripheral portion of the segments 2, 3 and 4 to grip a tape 10 therebetween. However, since the center section 7 of the roller 6 has a reduced diameter, only the end sections 8 and 9 are effective to press against the tape 10. Further these end sections 8 and 9 are arranged adjacent to the outer segments 4 and 2, respectively. Thus, the tape 10 is gripped between the end sections 8 and 9 and outer segments 4 and 2.

A second pinch roller 11 is similarly rotatably supported by a support means 12 adjacent to the capstan segments 2, 3 and 4. This pinch roller 11 is arranged to have a center section 13 with a larger diameter than either of the two end sections 14 and 15. The support means 12 is also arranged to resiliently press the roller 11 against a peripheral portion of the capstan segments 2, 3 and 4 substantially diametrically opposite to that contacted by the first roller 6 whereby to also grip the tape 10. Since the center section 13 of the second roller 11 has a larger diameter than end sections 14 and 15, only the center section 13 is arranged to press against the tape 10. The center section 13 is arranged adjacent to the center segment 3 to grip the tape 10 therebetween.

The second roller 11 has a fixed driving flange 16 at one end thereof. The flange 16 has a larger diameter than center section 13 and is adapted to be in operative contact with a driving rim 17 of the hub 1. The diameter of the driving rim 17 is arranged to produce, in combination with the diameter of the flange 16, a speed reducing coupling between the hub 1 and the second roller 11. Thus, the second roller 11 is driven at a lower revolution rate than the segments 2, 3 and 4.

Referring to FIG. 2 there is shown a cross-section of the capstan means shown in FIG. 1 along line 2—2. A pair of bearing means 20 are used to independently rotatably support the center segment 3 on the hub 1. The other two segments 2 and 4, and the driving rim 17 are joined to the hub 1 and are driven at the same rotational speed as the hub 1.

FIG. 3 is a pictorial representation of a tape 10 in a loop path with an idler 22 supporting the tape 10 in the loop.

The mode of operation of the present invention is as follows:

Assume the direction of rotation of the hub 1 is such that the tape 10 is drawn from a supply reel by driving motion of the second roller 11. The tape 10, after passing under this roller 11 is formed into a loop and is arranged to pass under the first roller 6. As previously discussed, the first roller 6 is arranged to grip the tape 10 between the end segments 2 and 4 and the end sections 8 and 9. Under these conditions, the tape 10 is driven at a linear speed corresponding to the peripheral speed of the end segments 2 and 4 which speed is directly determined by the rotational speed of the hub 1.

As previously mentioned, the diameter ratio of the driving rim 17 and the flange 16 is effective to produce a speed reducing coupling. Thus, the second roller 11 is driven at a lower rotational speed than the hub 1. Accordingly, the center section 13 of the second roller 11 is driven at a lower rotational speed than the end segments 2 and 4. This lower rotational speed is effective to produce a lower peripheral speed of the center section 13 with respect to the peripheral speed of the segments 2 and 4. Thus, the tape 10 is withdrawn from the aforesaid loop by the driving motion of the first roller 6 at a rate which tends to be faster than the rate at which it is fed into the loop by the driving motion of the second roller 11. This difference in driving rates is effective to maintain the tape 10 in close contact with an object in the tape loop; e.g., a tape reading magnetic head, idler, etc., by subjecting the tape 10 to a tensional force. Inasmuch as the tape 10 is relatively inelastic, the difference in motion at the two rollers 6 and 11 will maintain the tape 10 in a state of tension with slippage occurring between the center section 13 and the surface of the tape 10. It is to be noted that a selective driving of the tape 10 by only one of the rollers 6 and 11 is effective to produce a tape speed relationship dependent on the peripheral speed of that roller. Further, a reversal of rotational motion of the hub 1 is effective, in combination with the rollers 6 and 11, to produce a driving motion wherein the length of the loop of tape is gradually lengthened.

Accordingly, it may be seen that there has been provided, in accordance with the present invention, a capstan means for uniformly driving a moving tape in a loop while maintaining a state of tension in the tape.

What is claimed is:

1. A capstan means for driving a tape in a loop comprising a capstan having a driving hub for rotationally driving said capstan, a plurality of similar cylindrical segments concentrically supported by said hub, said segments forming a cylindrical tape-supporting surface, bearing means for supporting one of said segments on said hub as an independently rotatable segment, and means joining the remaining ones of said segments to said hub as fixed segments, a first pinch roller arranged to grip said tape between said roller and said fixed segments, said gripping of said tape being effective to impart a first motion to said tape in said loop, a second pinch roller arranged to grip said tape between said second roller and said rotatable segment to tend to impart a second motion to said tape in said loop, and means for driving said second roller at a different rotational speed from that of said hub whereby said first roller and said second roller are arranged to have different peripheral speeds.

2. A capstan means for driving a tape in a loop comprising a capstan having a driving hub for rotationally driving said capstan, a plurality of first cylindrical similar segments coaxially supported by and fixed to said hub, a second cylindrical segment having a diameter similar to said first segments, and bearing means for independently rotatably supporting said second segment on said hub, a first pinch roller arranged to grip said tape between said roller and said first segments on a first peripheral portion of said capstan on said first segments to impart a first motion to said tape in said loop, a second pinch roller arranged to grip said tape between said second roller and said second segment on a peripheral portion of said capstan on said second segment opposite to said first portion to tend to impart a second motion to said tape in said loop, and means for driving said second roller at a different rotational speed from that of said hub whereby said first roller and said second roller are arranged to have different peripheral speeds.

3. A capstan means for driving a tape in a loop comprising a capstan having a driving hub for rotationally driving said capstan, a plurality of first cylindrical similar segments supported by and driven by said driving hub, at least one second cylindrical segment having a diameter similar to said first segments and supported on said hub as an independently rotatably segment, a first pinch roller arranged to grip said tape between said roller and said first segments on a first peripheral portion of said capstan to impart a first motion to said tape, a second pinch roller arranged to grip said tape between said second roller and said second segment on a second peripheral portion of said capstan to impart a second motion to said tape in said loop, and means for driving said second roller at a different rotational speed from that of said first segments whereby said first roller and said second roller are arranged to have different peripheral speeds.

References Cited in the file of this patent

UNITED STATES PATENTS

| | | |
|---|---|---|
| 2,373,107 | Duffy | Apr. 10, 1945 |
| 2,913,192 | Mullin | Nov. 17, 1959 |